United States Patent

Hahn et al.

Patent Number: 5,112,362
Date of Patent: May 12, 1992

[54] NAVY DYE MIXTURES OF AZO DISPERSE DYES FOR POLYESTER

[75] Inventors: Erwin Hahn, Heidelberg; Guenter Hansen, Ludwigshafen; Gunther Lamm, Hassloch; Helmut Reichelt, Neustadt; Gerhard Wagenblast, Weisenheim, all of Fed. Rep. of Germany

[73] Assignee: BASF Aktiengesellschaft, Ludwigshafen, Fed. Rep. of Germany

[21] Appl. No.: 679,100

[22] Filed: Apr. 2, 1991

[30] Foreign Application Priority Data

Apr. 2, 1990 [DE] Fed. Rep. of Germany ....... 4010512

[51] Int. Cl.⁵ .............................................. C09B 29/00
[52] U.S. Cl. .................................... 8/639; 8/662; 8/690; 8/691; 8/922
[58] Field of Search .............................................. 8/639

[56] References Cited

U.S. PATENT DOCUMENTS 4,452,609  6/1984  Hamprecht ........................ 8/694
4,855,413  8/1989  Dehnert et al. .................. 534/766
4,908,041  3/1990  Hahn et al. ........................ 8/638

FOREIGN PATENT DOCUMENTS 362637  4/1990  European Pat. Off. .

Primary Examiner—A. Lionel Clingman
Attorney, Agent, or Firm—Oblon, Spivak, McClelland, Maier & Neustadt

[57] ABSTRACT

Dye mixtures useful for dyeing or printing synthetic fabrics contain at least one azo dye whose diazo component is 2-amino-3,5-dicyano-4-methylthiophene and whose coupling component comes from the 2-amino-4-thienylthiazole series and also at least one azo dye whose diazo component is 2-amino-3,5-dicyano-4-methylthiophene, 2-amino-3-alkoxycarbonyl-5-cyano-4-methylthiophene or 2-amino-5-alkoxycarbonyl-3-cyano-4-methylthiophene and whose coupling component comes from the 3-cyano-4-methyl-2,6-diaminopyridine series, and/or at least one azo dye whose diazo component is a 2,6-dicyano-4-alkylaniline and whose coupling component comes from the m-phenylenediamine series.

4 Claims, No Drawings

NAVY DYE MIXTURES OF AZO DISPERSE DYES FOR POLYESTER

The present invention relates to novel dye mixtures containing at least one dye of the formula I

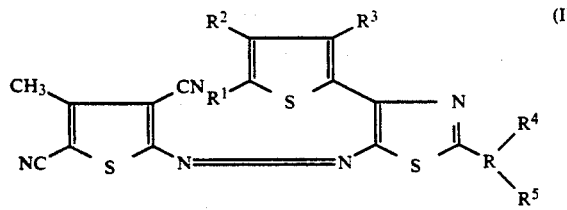

where
R$^1$, R$^2$ and R$^3$ are identical or different and each is independently of the others hydrogen or C$_1$–C$_4$-alkyl,
R$^4$ is C$_1$–C$_4$-alkyl or C$_3$–C$_8$-alkyl which is interrupted by from 1 to 3 oxygen atoms in ether function, and
R$^5$ is C$_1$–C$_4$-alkyl or C$_3$–C$_{12}$-alkyl which is interrupted by from 1 to 4 oxygen atoms in ether function,
and also at least one dye of the formula II

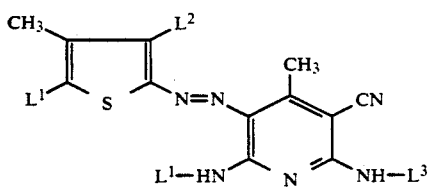

or at least one dye of the formula III

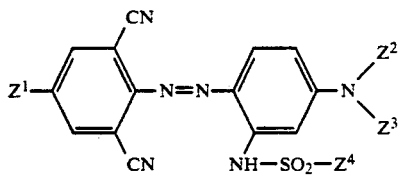

where L$^1$ and L$^2$ are each cyano or one of the two radicals may also be C$_1$–C$_2$-alkoxycarbonyl, one of the two radicals L$^3$ and L$^4$ is hydrogen while the other is a radical of the formula (CH$_2$)$_2$O(CH$_2$)$_2$OH, (CH$_2$)$_2$O(CH$_2$)$_2$OCOCH$_3$, (CH$_2$)$_3$OCH(CH$_3$)CH$_2$OCH$_3$, (CH$_2$)$_3$O(CH$_2$)$_4$OH, (CH$_2$)$_3$O(CH$_2$)$_4$OCHO, (CH$_2$)$_3$O(CH$_2$)$_4$OCOCH$_3$ or (CH$_2$)$_3$O(CH$_2$)$_2$OCH$_3$ and Z$^1$, Z$^2$, Z$^3$ and Z$^4$ are identical or different and each is independently of the others C$_2$–C$_4$-alkyl, wherein the weight ratio of dye I:dye II and/or III is from 80:20 to 96:4.

The thiopheneazo dyes of the formula I present in the novel mixtures are known and described for example in earlier patent application EP-A-362 637. On polyester they produce blue dyeings.

It is an object of the present invention to provide dye mixtures which produce navy shades on polyester with a good buildup and a high yield.

We have found that this object is achieved by the dye mixtures defined at the beginning.

Any alkyl appearing in the abovementioned formulae I, II and III may be either straight-chain or branched.

R$^1$, R$^2$, R$^3$, R$^4$, R$^5$, Z$^1$, Z$^2$, Z$^3$ and Z$^4$ are each for example methyl, ethyl, propyl, isopropyl, butyl, isobutyl, sec-butyl or tert-butyl.

R$^4$ and R$^5$ may each also be for example 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butoxypropyl, 2-or 4-methoxybutyl, 2- or 4-ethoxybutyl, 2- or 4-propoxybutyl, 2- or 4-butoxybutyl, 3,6-dioxaheptyl, 3,6-dioxaoctyl, 4,8-dioxanonyl, 3,7-dioxaoctyl, dioxanonyl, 4,7-dioxaoctyl, 4,7-dioxa-5-methyloctyl, 4,7-dioxanonyl, 4,8-dioxadecyl, 3,6,9-trioxadecyl, 3,6,9-trioxaundecyl, 4,7,10-trioxaundecyl or 4,7,10-trioxadodecyl.

R$^5$ may also be for example 3,6,9,12-tetraoxatridecyl or 3,6,9,12-tetraoxatetradecyl.

L$^1$ and L$^2$ are each for example methoxycarbonyl or ethoxycarbonyl.

Preference is given to dye mixtures in which the weight ratio of dye I:dye II and/or dye III is from 80:20 to 96:4.

Preference is further given to dye mixtures which contain a dye of the formula I in which R$^4$ and R$^5$ are different from each other.

Particular emphasis must be given to dye mixtures which contain a dye of the formula I in which
R$^1$, R$^2$ and R$^3$ are identical or different and each is independently of the others hydrogen or methyl,
R$^4$ is C$_2$–C$_4$-alkyl or C$_3$–C$_8$-alkyl which is interrupted by from 1 to 3 oxygen atoms in ether function, and
R$^5$ is C$_3$–C$_4$-alkyl or C$_3$–C$_{12}$-alkyl which is interrupted by from 1 to 4 oxygen atoms in ether function.

Particular emphasis must further be given to dye mixtures which contain a dye of the formula I in which R$^4$ is C$_2$–C$_4$-alkyl and R$^5$ is C$_3$–C$_{12}$-alkyl which is interrupted by from 1 to 4 oxygen atoms in ether function.

Particular emphasis must further be given to dye mixtures which contain a dye of the formula II in which L$^1$ and L$^2$ are each cyano or one of the two radicals may also be methoxycarbonyl and one of the two radicals L$^3$ and L$^4$ is hydrogen while the other is a radical of the formula (CH$_2$)$_2$O(CH$_2$)$_2$OH, (CH$_2$)$_2$O(CH$_2$)$_2$OCOCH$_3$, (CH$_2$)$_3$O(CH$_2$)$_4$OH or (CH$_2$)$_3$O(CH$_2$)$_4$OCOCH$_3$.

Particular emphasis must be given to dye mixtures which contain a dye of the formula III in which
Z$^1$ is methyl or ethyl,
Z$^2$ and Z$^3$ are each C$_2$–C$_3$-alkyl and
Z$^4$ is methyl or ethyl.

Of particular suitability are dye mixtures which contain a dye of the formula I in which R$^4$ is C$_2$–C$_3$-alkyl and R$^5$ is 3-methyoxypropyl, 3-ethoxypropyl, 4,7-dioxaoctyl, 4,7-dioxa-5-methyloctyl, 4,7-dioxanonyl, 4,7,10-trioxaundecyl or 4,7,10-trioxadodecyl.

Of particular interest are dye mixtures which contain at least one dye of the formula I and at least one dye of the formula II.

Important dyes of the formula II are for example

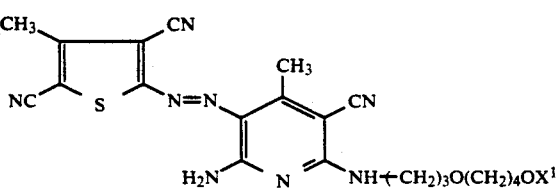

-continued

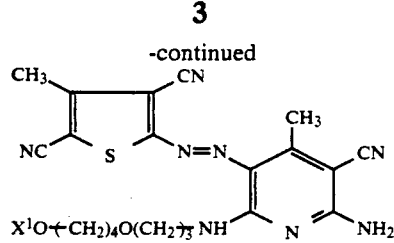

(where $X^1$ is in each case hydrogen, formyl, acetyl or propionyl)

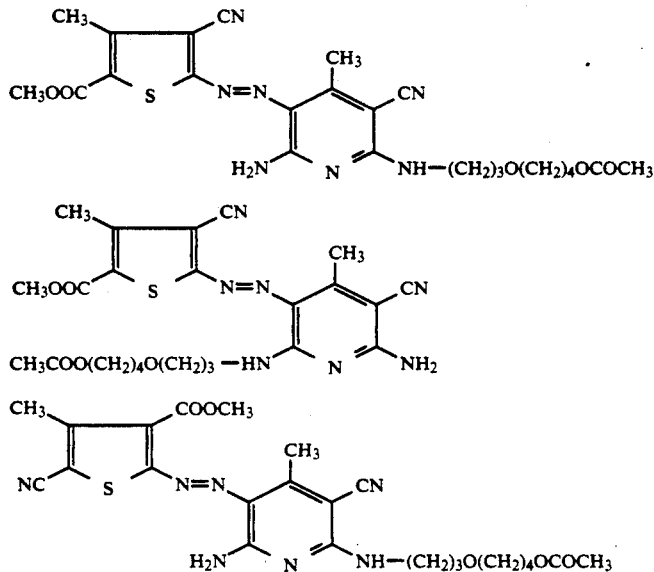

(where $X^2$ is in each case hydrogen, formyl or acetyl).

Important dyes of the formula III are for example

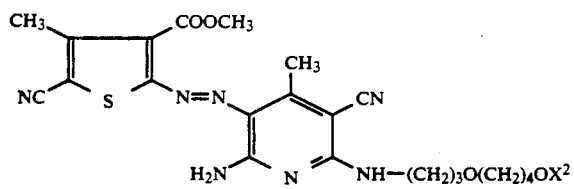

and

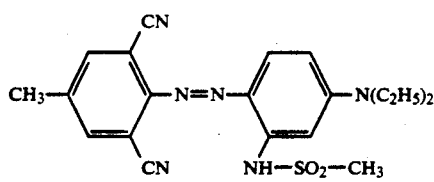

In the mixture of dyes I, II and/or III, the dyes may be present either as individual components or else as mixtures with one another. For example, it is possible to prepare dye mixtures which contain a mixture of dyes of the formula I, a mixture of dyes of the formula II and/or a mixture of dyes of the formula III.

The mixtures of the individual dyes I, II and/or III with one another can be obtained by mechanical mixing or by mixed coupling.

Mixtures between dyes I are preferably prepared by mixed coupling.

In this case the following coupling components are of particular interest:

(IVa)

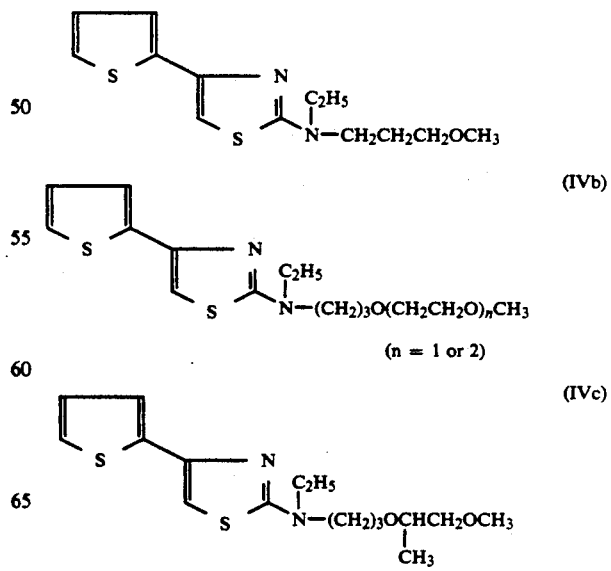

(IVb)

(n = 1 or 2)

(IVc)

-continued (IVd) 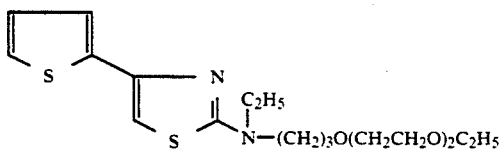

(IVe) 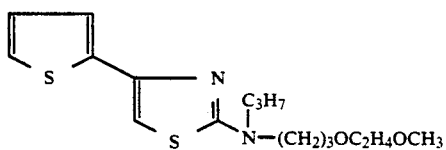

(IVf) 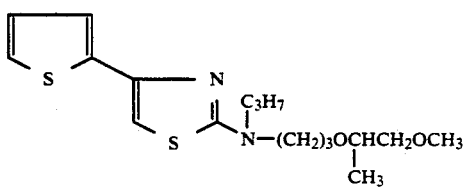

(IVg) 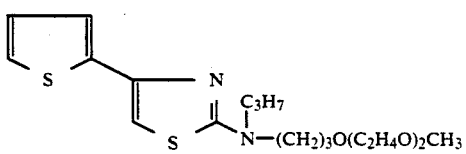

(IVh) 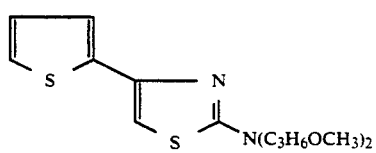

Particularly suitable mixtures of dyes of the formula I are obtained for example by mixed coupling of the diazonium compound derived from 2-amino-3,5-dicyano-4-methylthiophene with mixtures of the coupling components of the formula
IVa, IVb, (n=1) and IVc;
IVa, IVc, and IVe;
IVa, IVc, and IVf;
IVb (n=1), IVc and IVe;
IVb (n=1), IVc and IVf or
IVa, IVc, IVe and IVh.

The dyes of the formulae I, II and III are in general dyes known per se. As mentioned above, the thiophene azo dyes of the formula I are described for example in earlier patent application EP-A-362 637. The dyes of the formula II are known for example from EP-A-214 445, and those of the formula III for example from DE-A-2 711 130.

The dye mixtures according to the present invention are prepared by mixing the respective components in the specified weight ratio. If desired, the novel mixtures may include further components, for example dispersants or shading dyes (for example from 0.1 to 2% by weight of an orange dye, based on the weight of dyes I, II and/or III). It is also possible to mix ready-made dye preparations of the respective components.

The novel dye mixtures are suitable for dyeing and printing synthetic fabrics, in particular polyester fabrics, producing dyeings and prints in navy shades of good light fastness and high color strength.

A further advantage of the dye mixtures according to the present invention is their occupational hygiene safeness.

The dyeing and printing processes are known per se. Further details may be found in the Examples.

The Examples which follow further illustrate the invention.

EXAMPLE 1

33.33 g of the dye of the formula

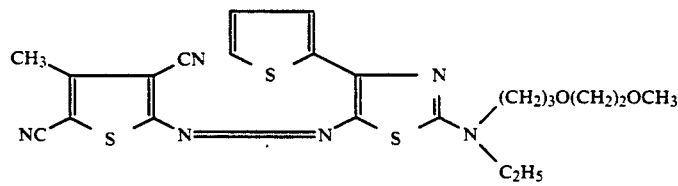

33.33 g of the dye of the formula

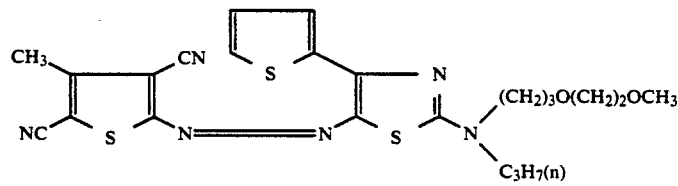

and 33.33 g of the dye of the formula

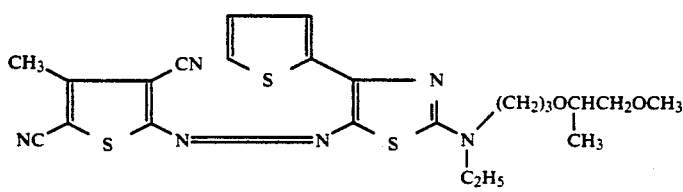

were mechanically mixed. 9.33 g of the dye of the formula

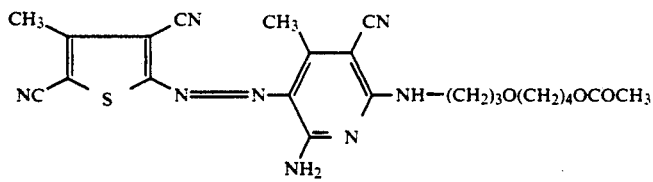

and 4.67 g of the dye of the formula

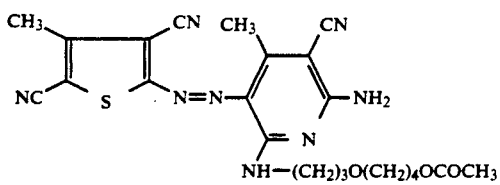

were added. This was followed by intensive mixing. Then 176 g of a dispersant based on ligninsulfonate were added to prepare 290 g of an aqueous disperse dye mixture.

10 g of polyester fabric were introduced at 60° C. into 200 ml of an aqueous dyeing liquor containing 0.4 g of the abovementioned dye mixture, adjusted to pH 4.5 with acetic acid. After 5 minutes at 60° C., the liquor was heated to 135° C. in the course of 30 minutes, maintained at that temperature for 60 minutes and then cooled back down to 60° C. in the course of 20 minutes.

Then the dyed polyester fabric was reduction cleared by treating it at 65° C. in 200 ml of liquor containing per liter 5 ml of 32% strength by weight sodium hydroxide solution, 3 g of sodium dithionite and 1 g of an addition product of 48 mol of ethylene oxide with 1 mol of castor oil for 15 minutes. Finally the fabric was rinsed, neutralized with dilute acetic acid, rinsed once more and dried.

The result was a reddish navy dyeing of navy depth 1 of high fastness to light and dry heat setting and pleating.

EXAMPLE 2

Example 1 was repeated, except that the mixture of the thiopheneazo dyes having a thiazole coupling component was prepared not by mechanical mixing but by mixed coupling. The dyeings obtained likewise had favorable qualities.

EXAMPLE 3

10 g of polyester fabric were dyed by the method of Example 1 with the same amounts of the dyes mentioned and additionally with 1.1 g of a shading dye (orange) of the formula

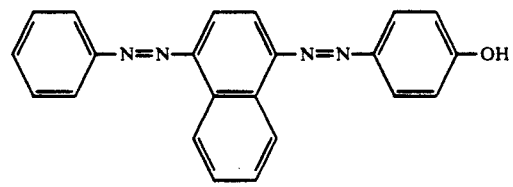

The result was a reddish navy dyeing of depth 1 of very good fastness to light and dry heat setting and pleating.

EXAMPLE 4

0.16 g of mixture of the dyes of the formula

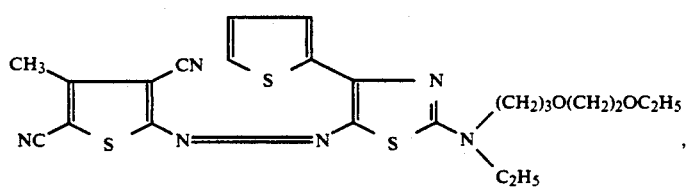

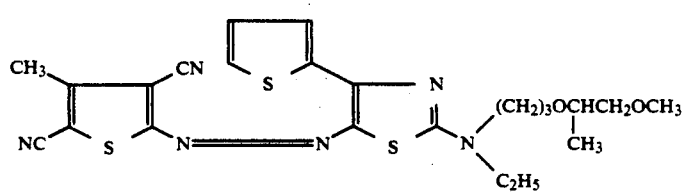

and

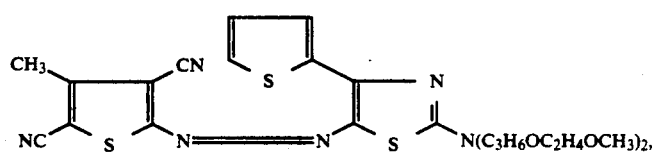

prepared by mixed coupling of equal molar amounts of the respective coupling components, was dispersed in the manner of Example 1 and introduced into the aqueous dyeing liquor (200 ml). A further 0.014 g was added of a mixture of the dye of the formula

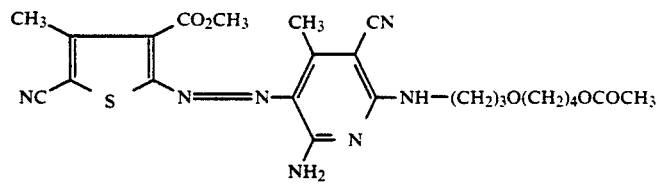

and

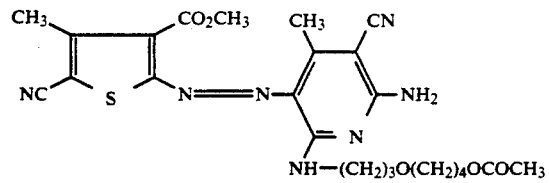

plus 0.0032 g of a shading dye (orange) of the formula

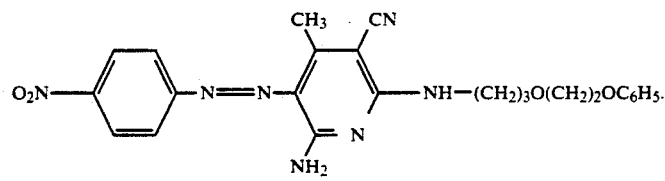

Then 10 g of polyester fabric were dyed as described in Example 1.

The result obtained was a navy dyeing of depth 1 of high light fastness.

EXAMPLE 5

A mixture was used of 0.08 g each of the dyes of the formula

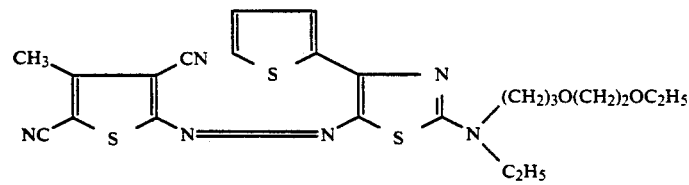

and

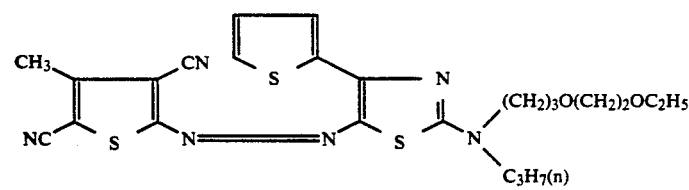

in place of the thiopheneazothiazole dyes mentioned in Example 4 and Example 3 was repeated. This produced a navy dyeing of depth 1 of high light fastness.

Similar results are obtained on mixing the dyes listed below in Tables 1 to 3, which conform to formulae I, II and III, as per the preceding Examples.

TABLE 1

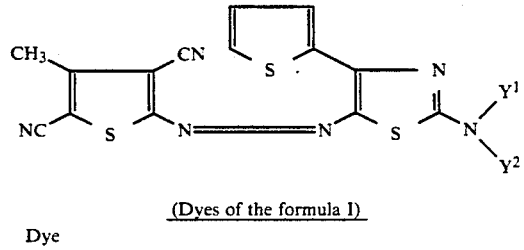

(Dyes of the formula I)

| No. | $Y^1$ | $Y^2$ |
|---|---|---|
| 6 | $(CH_2)_3OCH_3$ | $(CH_2)_3OCH_3$ |
| 7 | $(CH_2)_3O(CH_2CH_2O)_2CH_3$ | $C_2H_5$ |
| 8 | $(CH_2)_3O(CH_2CH_2O)_2C_2H_5$ | $C_2H_5$ |
| 9 | $(CH_2)_3O(CH_2CH_2O)_2C_2H_5$ | $C_3H_7(n)$ |
| 10 | $\underset{(CH_2)_3OCHCH_2OCH_3}{\overset{CH_3}{\|}}$ | $C_3H_7(n)$ |
| 11 | $(CH_2)_3OC_2H_5$ | $(CH_2)_3OCH_3$ |
| 12 | $(CH_2)_3OCH_3$ | $C_3H_7(n)$ |

TABLE 1-continued

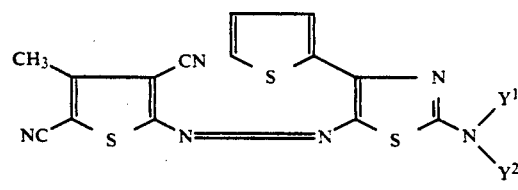

(Dyes of the formula I)

| Dye No. | $Y^1$ | $Y^2$ |
|---|---|---|
| 13 | $(CH_2)_2O(CH_2)_2OCH_3$ | $C_3H_7(n)$ |
| 14 | $(CH_2)_2O(CH_2)_2OC_2H_5$ | $C_2H_5$ |

TABLE 2

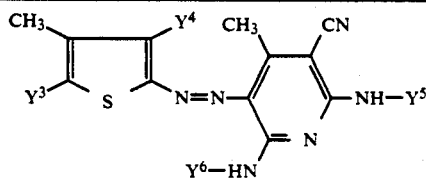

(Dyes of the formula II)

| Dye No. | $Y^3$ | $Y^4$ | one of $Y^5$ and $Y^6$ = hydrogen while the other is |
|---|---|---|---|
| 15 | $CO_2CH_3$ | CN | $(CH_2)_3O(CH_2)_4OCOCH_3$ |
| 16 | $CO_2CH_3$ | CN | $(CH_2)_3OCHCH_2OCH_3$ <br> \| <br> $CH_3$ |
| 17 | CN | $CO_2CH_3$ | $(CH_2)_3OCHCH_2OCH_3$ <br> \| <br> $CH_3$ |
| 18 | CN | $CO_2CH_3$ | $(CH_2)_2O(CH_2)_2OCOCH_3$ |
| 19 | CN | $CO_2CH_3$ | $(CH_2)_3O(CH_2)_4OH$ |
| 20 | CN | $CO_2CH_3$ | $(CH_2)_3O(CH_2)_4OCOH$ |
| 21 | CN | $CO_2CH_3$ | $(CH_2)_3O(CH_2)_4OCOCH_3$ |
| 22 | CN | CN | $(CH_2)_3O(CH_2)_4OCOCH_3$ |
| 23 | CN | CN | $(CH_2)_3OCHCH_2OCH_3$ <br> \| <br> $CH_3$ |

TABLE 3

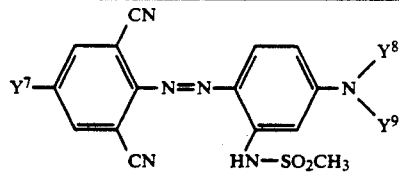

(Dyes of the formula III)

| Dye No. | $Y^7$ | $Y^8$ | $Y^9$ |
|---|---|---|---|
| 24 | $CH_3$ | $C_2H_5$ | $C_2H_5$ |
| 25 | $CH_3$ | $C_2H_5$ | $C_3H_7$ |
| 26 | $CH_3$ | $C_3H_7(n)$ | $C_3H_7(n)$ |
| 27 | $C_2H_5$ | $C_2H_5$ | $C_2H_5$ |

We claim:

1. A dye mixture containing at least one dye of the formula I

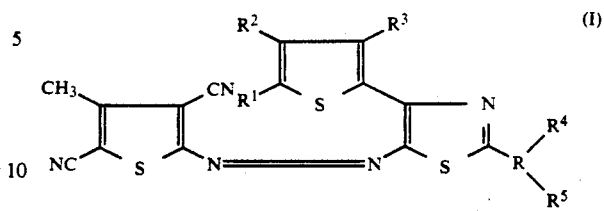

where
$R^1$, $R^2$ and $R^3$ are identical or different and each is independently of the others hydrogen or $C_1$-$C_4$-alkyl,
$R^4$ is $C_1$-$C_4$-alkyl or $C_3$-$C_8$-alkyl which is interrupted by from 1 to 3 oxygen atoms in ether function, and
$R^5$ is $C_1$-$C_4$-alkyl or $C_3$-$C_{12}$-alkyl which is interrupted by from 1 to 4 oxygen atoms in ether function,
and also at least one dye of the formula II

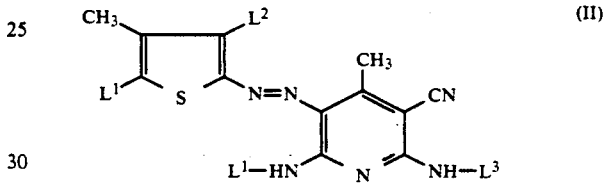

or at least one dye of the formula III

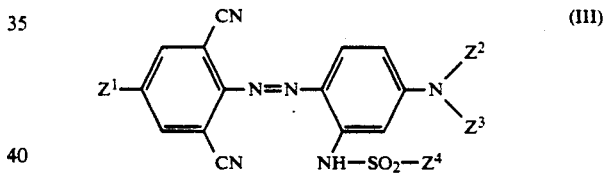

where
$L^1$ and $L^2$ are each cyano or one of the two radicals may also be $C_1$-$C_2$-alkoxycarbonyl,
one of the two radicals $L^3$ and $L^4$ is hydrogen while the other is a radical of the formula $(CH_2)_2O(CH_2)_2OH$, $(CH_2)_2O(CH_2)_2OCOCH_3$, $(CH_2)_3OCH(CH_3)CH_2OCH_3$, $(CH_2)_3O(CH_2)_4OH$, $(CH_2)_3O(CH_2)_4OCHO$, $(CH_2)_3O(CH_2)_4OCOCH_3$ or $(CH_2)_3O(CH_2)_2OCH_3$ and
$Z^1$, $Z^2$, $Z^3$ and $Z^4$ are identical or different and each is independently of the others $C_1$-$C_4$-alkyl,
wherein the weight ratio of dye I:dye II and/or III is from 80:20 to 96:4.

2. A dye mixture as claimed in claim 1, wherein the weight ratio of dye I:dye II and/or III is from 86:14 to 94:6.

3. A dye mixture as claimed in claim 1, containing a dye of the formula I in which $R^4$ and $R^5$ are different from each other.

4. A method of using a dye mixture as claimed in claim 1 for dyeing or printing a synthetic fabric.

* * * * *